US012689311B2

(12) United States Patent
Chiang et al.

(10) Patent No.: US 12,689,311 B2
(45) Date of Patent: Jul. 21, 2026

(54) SELF-POWER-GENERATION STRUCTURE AND AUGMENTED REALITY GLASS

(71) Applicants:Asphetek Solution (Chengdu) Ltd., Chengdu (CN); ADVANCED OPTOELECTRONIC TECHNOLOGY, INC., Hsinchu County (TW); Asphetek Solution Inc., Hsinchu (TW)

(72) Inventors: Chen-An Chiang, Hsinchu (TW); Ying-Hung Tsai, Hsinchu (TW); Chung-Wu Liu, Hsinchu (TW)

(73) Assignees: Asphetek Solution (Chengdu) Ltd, Chengdu (CN); ADVANCED OPTOELECTRONIC TECHNOLOGY, INC., Hsinchu County (TW); Asphetek Solution Inc., Hsinchu County (TW)

( * ) Notice: Subject to any disclaimer, the term of this patent is extended or adjusted under 35 U.S.C. 154(b) by 189 days.

(21) Appl. No.: 18/646,633

(22) Filed: Apr. 25, 2024

(65) Prior Publication Data

US 2025/0211137 A1 Jun. 26, 2025

(30) Foreign Application Priority Data

Dec. 22, 2023 (CN) .......................... 202323521658.0

(51) Int. Cl.
*H02N 1/04* (2006.01)
*G02B 27/01* (2006.01)

(52) U.S. Cl.
CPC ........... *H02N 1/04* (2013.01); *G02B 27/0176* (2013.01)

(58) Field of Classification Search
CPC .............................. H02N 1/04; G02B 27/0176
See application file for complete search history.

(56) References Cited

U.S. PATENT DOCUMENTS

2016/0049108 A1* 2/2016 Yajima .................. A63F 13/212
345/212
2017/0086668 A1* 3/2017 Francois ................ A61B 3/145

* cited by examiner

*Primary Examiner* — Sean Gugger
(74) *Attorney, Agent, or Firm* — ScienBiziP, P.C.

(57) ABSTRACT

A self-power-generation structure is provided, the self-power-generation structure comprise an electrode layer, a negative friction layer, a substrate, and a positive friction layer. The positive friction layer provides positive charges and is configured to attach to a face of a user, the negative friction layer configured to provide negative charges, the electrode layer couples with a circuit of the AR glass, a part of the positive friction layer near the hollow portion is deformed to be closer to the negative friction layer as the user blinking, until the positive friction layer is in contact with the negative friction layer, then the part of the positive friction layer towards the hollow portion is deformed away from the negative friction layer, the electrode layer supplies power to the circuit of the AR glass. The Augmented Reality glass is also provided.

20 Claims, 4 Drawing Sheets

100

SELF-POWER-GENERATION STRUCTURE AND AUGMENTED REALITY GLASS

FIELD

The present disclosure relates to field of Augmented Reality (AR) glasses technology, particularly to a self-power-generation structure and an Augmented Reality glass.

BACKGROUND

With a development of science and technology, sales and applications of AR glasses have grown in recent years. At present, existing AR glasses have a large power consumption, but a battery of the existing AR glass may not be able to support the large power consumption of the existing AR glass for a long period of time. So, the AR glasses needs to be charged frequently.

The existing AR glasses applies a contact charging mode, such as via a connector. The contact charging mode requires a user to plug the connector, the contact charging mode is inconvenience and has a low charging efficiency. When the user does not wear the AR glass, the AR glass is usually stored in locations, such in as a handbag, where the AR glass can't be charges. In addition, the contact charging mode may cause abrasions of a charging port easily, resulting sparks.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of one embodiment described herein.

Several definitions that apply throughout this disclosure will now be presented.

The term "coupled" is defined as coupled, whether directly or indirectly through intervening components, and is not necessarily limited to physical connections. The connection may be such that the objects are permanently coupled or releasably coupled. The term "substantially" is defined to be essentially conforming to the particular dimension, shape, or other feature that the term modifies, such that the component need not have that exact feature. The term "comprising," when utilized, means "including, but not necessarily limited to"; it specifically indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein comprises any and all combinations of one or more of associated listed items.

Some embodiments of the present application are described in detail. In the case of no conflict, the following embodiments and the features in one embodiment can be combined with each other.

Figure 1:
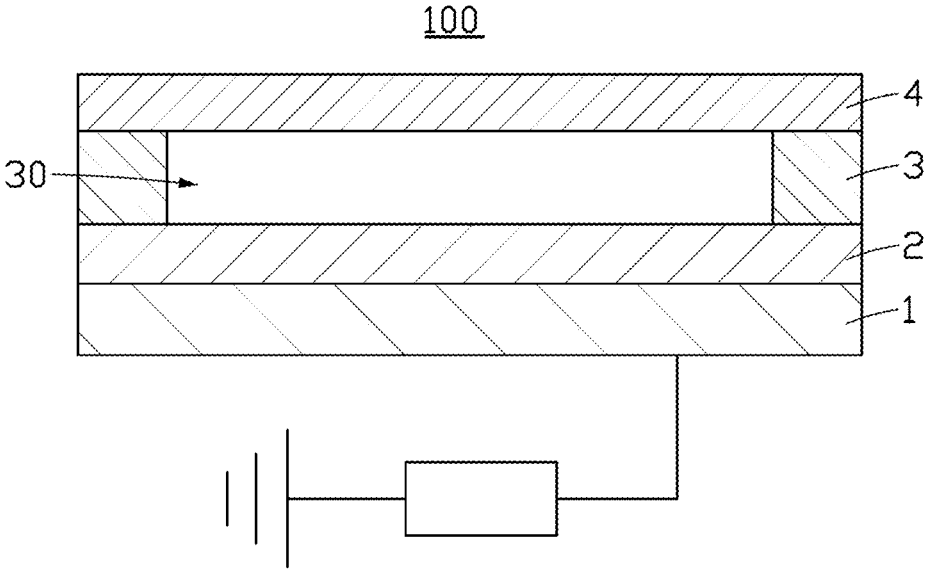
FIG. 1 illustrates a schematic view of a self-power-generation structure in an embodiment of the present disclosure.

Referring to FIG. 1, one embodiment of the present application discloses a self-power-generation structure 100. The self-power-generation structure 100 is applied to the AR glass. The self-power-generation structure 100 includes an electrode layer 1, a negative friction layer 2, a substrate 3, and a positive friction layer 4. The electrode layer 1, the negative friction layer 2, the substrate 3 and the positive friction layer 4 are successively stacked. The positive friction layer 4 provides positive charges, the positive friction layer 4 is configured to attach to a face of a user when the user wears the AR glass. A center area of the substrate 3 defines a hollow portion 30. The negative friction layer 2 is configured to provide negative charges. The electrode layer 1 is electrically connected to a circuit of the AR glass.

A part of the positive friction layer 4 near the hollow portion 30 is deformed to be closer to the negative friction layer 2 as the user blinking, until the positive friction layer 4 is in contact with the negative friction layer 2. Then, the part of the positive friction layer 4 towards the hollow portion 30 is deformed away from the negative friction layer 2, the negative charges move towards the positive friction layer 4 and positive charges move towards the negative friction layer 2 to generate power. The movement of positive and negative charges creates an electric current flowing between the electrode layer 1 and the circuit of the AR glasses, the electrode layer 1 supplies the power to the circuit of the AR glass.

In one embodiment, the self-power-generation structure 100 is arranged on the AR glass, when the user wears the AR glass, the positive friction layer 4 is configured to attach to the face of a user. When the user closes his eyes, the positive friction layer 4 will be deformed with a movement of muscles around the user's eyes, the part of the positive friction layer 4 near the hollow portion 30 is deformed close to the negative friction layer 2. The positive friction layer 4 provides positive charges, the negative friction layer 2 provides negative charges, when the positive friction layer 4 is close to the negative friction layer 2, a potential difference between the positive friction layer 4 and the negative friction layer 2 gradually decreases, and a plurality of electrons flows from the circuit of the AR glasses into the electrode layer 1 to form a current.

When the positive friction layer 4 contacts to the negative friction layer 2 in a large area, a plurality of bound charges is in a neutral state, the potential difference between the electrode layer 1 and the circuit of the AR glass disappears, the plurality of electrons stops flowing. When the user opens his eyes, the positive friction layer 4 deforms in a direction away from the negative friction layer 2 to restore an original state, the plurality of electrons flows from the electrode layer 1 into the circuit of the AR glasses to form an opposite current, an entire power generation process is completed, and an automatic power generation of the AR glasses is realized.

Figure 2:
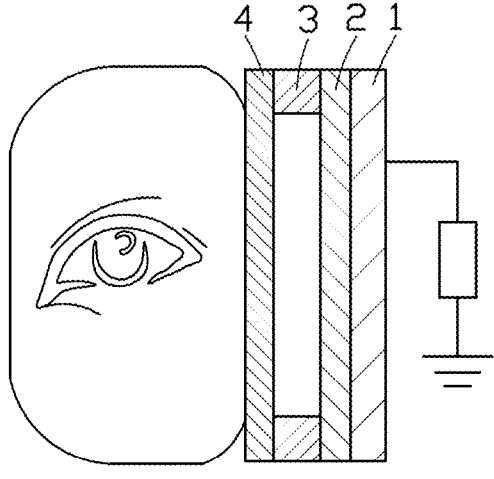
FIG. 2 illustrates an application scenario diagram of the self-power-generation structure in an embodiment of the present disclosure.
Figure 2:
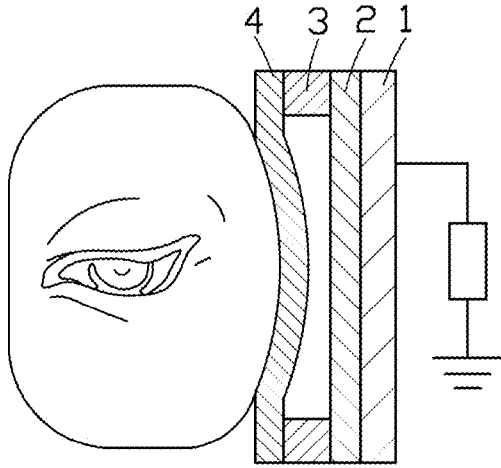
Figure 2:
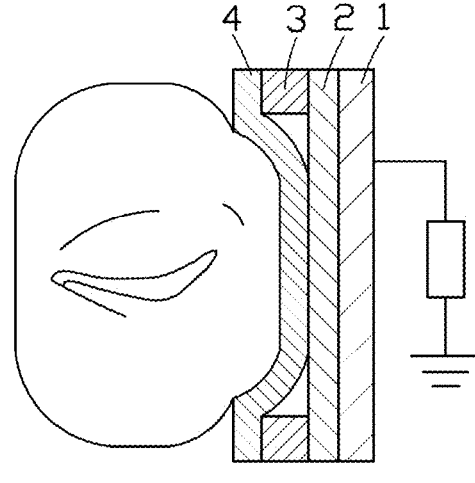

Referring to FIG. 2, when the user wears the AR glass, the positive friction layer 4 is configured to attach to the face of the user. When the user closes his eyes, the positive friction layer 4 will be deformed with a movement of muscles around the user's eyes, the part of the positive friction layer 4 near the hollow portion 30 is deformed to be closer to the negative friction layer 2, until the positive friction layer 4 attaches to the negative friction layer 2 in the large area. The potential difference between the positive friction layer 4 and the negative friction layer 2 gradually decreases, the plurality of electrons flows from the circuit of the AR glasses into the electrode layer 1. After the positive friction layer 4 attaches the negative friction layer 2 in the large area, the bound charge is almost in the neutral state, the potential difference between the electrode layer 1 and the circuit of the AR glass disappears, the plurality of electrons stops flowing.

In one embodiment, a depth of the positive friction layer 4 is 0.04 mm-0.06 mm. The positive friction layer 4 can make the self-power-generation structure 100 has better power generation function and improves the user experience. In one embodiment, the depth of the positive friction layer 4 is 0.05 mm, the positive friction layer 4 can make the self-power-generation structure 100 have better power generation function, and the self-power-generation structure 100 has lower thickness.

In one embodiment, a material of the positive friction layer 4 includes natural latex.

In one embodiment, a depth of the negative friction layer 2 is 15 μm-30 μm. The negative friction layer 2 can make the self-power-generation structure 100 has better power generation function and improves the user experience. In one embodiment, the depth of the negative friction layer 2 is 20 μm.

In one embodiment, a material of the negative friction layer 2 includes fluorinated ethylene propylene.

In one embodiment, a depth of the substrate 3 is 0.2 mm-1 mm. In one embodiment, the depth of the substrate 3 is 0.2 mm. The substrate 3 can decrease a depth of the self-power-generation structure 100.

In one embodiment, a material of the substrate 3 includes polyethylene glycol terephthalate.

In one embodiment, a maximum diameter of the hollow portion 30 is 15 mm and 25 mm. The hollow portion 30 can ensure that the positive friction layer 4 attaches to the negative friction layer 2 in the large area, a power generation effect of the self-electric structure 100 is improved.

In one embodiment, a depth of the electrode layer 1 is 40 nm and 50 nm. In one embodiment, the depth of the electrode layer 1 is 50 nm. The electrode layer 1 is Polyethylene terephthalate (ITO) electrode.

Figure 3:
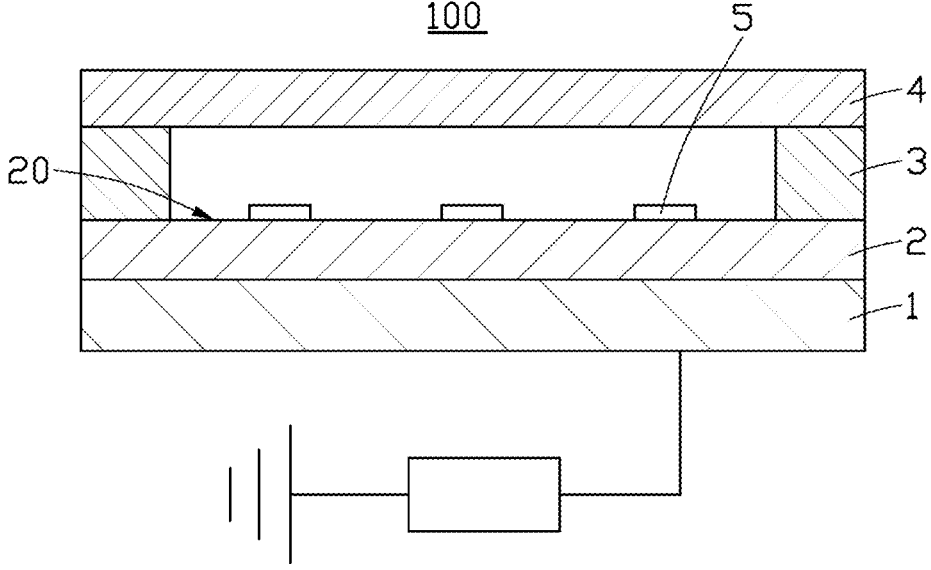
FIG. 3 illustrates a schematic view of a self-power-generation structure in an embodiment of the present disclosure.

Referring to FIG. 3, the negative friction layer 2 includes a first surface 20, the first surface 20 is located on a side of the negative friction layer 2 close to the positive friction layer 4, the first surface 20 is a part of an inner wall of the hollow portion 30. The first surface 20 provides with one or more graphic portion 5. Friction between the positive friction layer 4 and the negative friction layer 2 can be increased by the graphic portion 5, and the power generation effect of the self-electric structure 100 is improved.

As shown in FIG. 3, the graphic portion 5 is a projection extending from the first surface 20 close to the positive friction layer 4, and the graphic portion 5 is placed in the hollow portion 30. In one embodiment, the graphic portion 5 is a groove sinking from the first surface 20 away from the positive friction layer 4, and the graphic portion 5 is communicated with the hollow portion 30. In another embodiment, the graphic portion 5 can also be interleaved for a structure of the projection and the groove.

Figure 4:
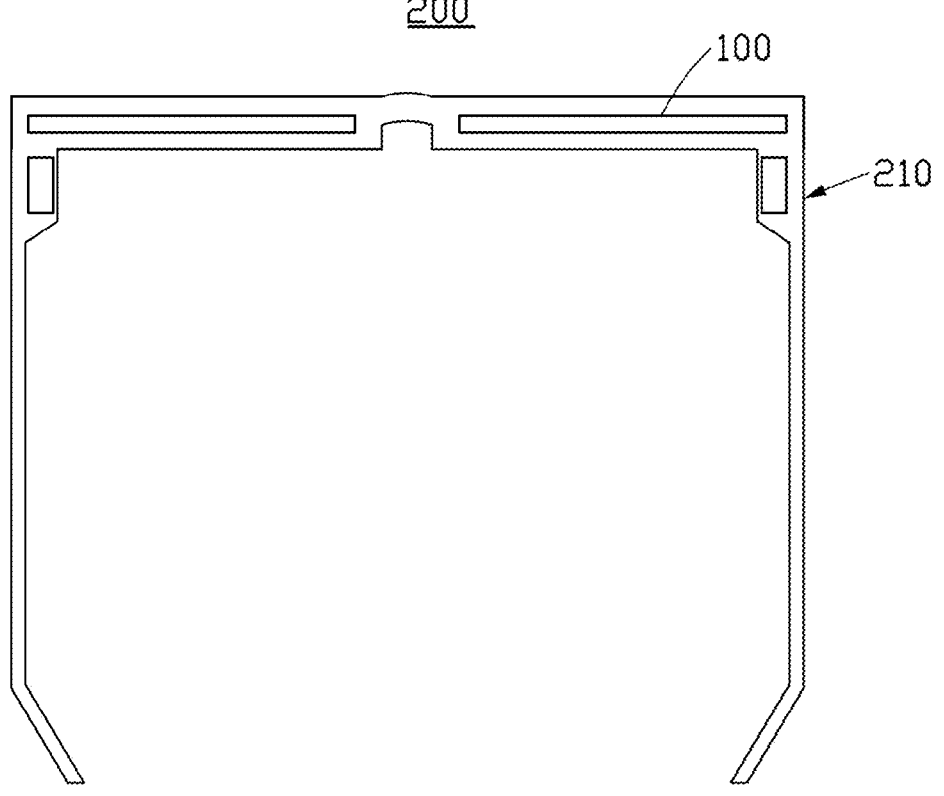
FIG. 4 illustrates a schematic view of an Augmented Reality glass in an embodiment of the present disclosure.

As shown in FIG. 4, one embodiment of the present application discloses the AR glass 200. The AR glass 200 includes glass frame 210. The self-electric structure 100 is installed in the glass frame 210. The AR glass 200 includes the electrode layer 1, the negative friction layer 2, the substrate 3, and the positive friction layer 4. The electrode layer 1, the negative friction layer 2, the substrate 3 and the positive friction layer 4 are successively stacked. The positive friction layer 4 provides positive charges, the positive friction layer 4 is configured to attach to the face of the user when the user wears the AR glass 200. The center area of the substrate 3 defines the hollow portion 30, the negative friction layer 2 provides negative charges, the electrode layer 1 couples with the circuit of the AR glass. The part of the positive friction layer 4 towards the hollow portion 30 is deformed to be closer to the negative friction layer 2 as the user blinking, until the positive friction layer 4 is in contact with the negative friction layer 2. Then, the part of the positive friction layer 4 near the hollow portion 30 is deformed away from the negative friction layer 2, the negative charges move towards the positive friction layer 4 and positive charges move towards the negative friction layer 2 to generate power, the electrode layer 1 supplies the power to the circuit of the AR glass 200.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A self-power-generation structure applied to an Augmented Reality (AR) glasses, the self-power-generation structure comprising:

an electrode layer electrically connectable to a circuit of the AR glasses, a negative friction layer configured to generate negative charges, a substrate, a center area of the substrate defining a hollow portion, and a positive friction layer configured to generate positive charges and to attach to a face of a user in response to the AR glasses been worn on the face, wherein the electrode layer, the negative friction layer, the substrate, and the positive friction layer are successively stacked, and wherein in response to the user blinking, the electrode layer supplies electrical power to the circuit of the AR glasses as a part of the positive friction layer near the hollow portion deformed by facial muscles around eyes of the user and moved closer to the negative friction layer, until the positive friction layer is in contact with the negative friction layer, and the part of the positive friction layer near the hollow portion moved away from the negative friction layer by facial muscles around eyes of the user, such that the negative charges move towards the positive friction layer and positive charges move towards the negative friction layer to generate the electrical power supplied to the circuit.

2. The self-power-generation structure as claimed in claim 1, wherein a thickness of the positive friction layer is in a range between 0.04 mm to 0.06 mm.

3. The self-power-generation structure as claimed in claim 1, wherein a thickness of the negative friction layer is in a range between 15 μm to 30 μm.

4. The self-power-generation structure as claimed in claim 1, wherein a thickness of the substrate is in a range between 0.2 mm to 1 mm.

5. The self-power-generation structure as claimed in claim 1, wherein a maximum diameter of the hollow portion is in a range between 15 mm and 25 mm.

6. The self-power-generation structure as claimed in claim 1, wherein a thickness of the electrode layer is in a range between 40 nm and 50 nm.

7. The self-power-generation structure as claimed in claim 1, wherein the negative friction layer comprises a first surface, the first surface is on a side of the negative friction layer close to the positive friction layer, the first surface is a part of an inner wall of the hollow portion.

8. The self-power-generation structure as claimed in claim 7, wherein the first surface comprises a graphic portion, and the graphic portion is a projection extending from the first surface toward the positive friction layer and in the hollow portion.

9. The self-power-generation structure as claimed in claim 7, wherein the first surface comprises a graphic portion, the graphic portion is a groove extending from the first surface away from the positive friction layer, the graphic portion is communicated with the hollow portion.

10. The self-power-generation structure as claimed in claim 1, wherein a material of the positive friction layer comprises natural latex.

11. The self-power-generation structure as claimed in claim 1, wherein a material of the negative friction layer comprises fluorinated ethylene propylene.

12. The self-power-generation structure as claimed in claim 1, wherein a material of the substrate comprises polyethylene glycol terephthalate.

13. The self-power-generation structure as claimed in claim 1, wherein the electrode layer is Indium Tin Oxide (ITO) electrode.

14. An Augmented Reality (AR) glasses, comprising:
a circuit;
an electrode layer, electrically connected to the circuit, a negative friction layer configured to generate negative charges,
a substrate, a center area of the substrate defining a hollow portion, and
a positive friction layer configured to generate positive charges and to attach to a face of a user in response to the AR glasses been worn on the face, wherein the electrode layer, the negative friction layer, the substrate and the positive friction layer are successively stacked, and wherein in response to the user blinking, the electrode layer supplies electrical power to the circuit of the AR glasses as a part of the positive friction layer near the hollow portion deformed by facial muscles around eyes of the user and moved closer to the negative friction layer, until the positive friction layer is in contact with the negative friction layer, and the part of the positive friction layer near the hollow portion moved away from the negative friction layer by facial muscles around eyes of the user, such that the negative charges move towards the positive friction layer and positive charges move towards the negative friction layer to generate the electrical power supplied to the circuit.

15. The AR glasses claimed in claim 14, wherein a thickness of the positive friction layer is in a range of 0.04 mm to 0.06 mm.

16. The AR glasses as claimed in claim 14, wherein a thickness of the negative friction layer is in a range of 15 μm to 30 μm.

17. The AR glasses as claimed in claim 14, wherein a thickness of the substrate is in a range of 0.2 mm to 1 mm, and a maximum diameter of the hollow portion is in a range of 15 mm to 25 mm.

18. The AR glasses as claimed in claim 14, wherein the positive friction layer comprises natural latex, and the negative friction layer comprises fluorinated ethylene propylene.

19. The AR glasses as claimed in claim 14, wherein the negative friction layer comprises a first surface on a side of the negative friction layer close to the positive friction layer, and the first surface forms a part of an inner wall of the hollow portion; and the first surface comprises a graphic portion configured to increase friction between the positive friction layer and the negative friction layer.

20. The AR glasses as claimed in claim 19, wherein the graphic portion comprises a projection extending from the first surface toward the positive friction layer and in the hollow portion; or wherein the graphic portion comprises a groove recessed from the first surface away from the positive friction layer and in communication with the hollow portion.

* * * * *